United States Patent
Matake

(10) Patent No.: US 10,835,974 B2
(45) Date of Patent: Nov. 17, 2020

(54) WIRE COLLECTION DEVICE OF WIRE ELECTRICAL DISCHARGE MACHINE

(71) Applicant: FANUC CORPORATION, Yamanashi (JP)

(72) Inventor: Kazuyoshi Matake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/657,559

(22) Filed: Oct. 18, 2019

(65) Prior Publication Data

US 2020/0122254 A1 Apr. 23, 2020

(30) Foreign Application Priority Data

Oct. 23, 2018 (JP) .................................. 2018-199232

(51) Int. Cl.
*B23H 7/10* (2006.01)

(52) U.S. Cl.
CPC .................................... *B23H 7/108* (2013.01)

(58) Field of Classification Search
CPC ......... B23H 7/10; B23H 7/108; B65F 1/0046; B65F 1/006; B65F 1/0053
See application file for complete search history.

(56) References Cited

U.S. PATENT DOCUMENTS 5,506,381 A * 4/1996 Matsushima ............ B23H 7/10
206/388

FOREIGN PATENT DOCUMENTS

| JP | S627330 U | 1/1987 |
|---|---|---|
| JP | S63114819 A | 5/1988 |
| JP | H042523 U | 1/1992 |
| JP | H0441127 A | 2/1992 |
| JP | H0457626 A | 2/1992 |
| JP | H05253751 A | 10/1993 |
| JP | 2017121679 A | 7/2017 |

OTHER PUBLICATIONS

Office Action issued in JP 2018-199232; mailed by the Japanese Patent Office dated Jul. 21, 2020.

* cited by examiner

*Primary Examiner* — Geoffrey S Evans
(74) *Attorney, Agent, or Firm* — Studebaker & Brackett PC

(57) ABSTRACT

To provide a wire collection device of a wire electrical discharge machine capable of collecting a used wire electrode even while a power supply for the wire electrical discharge machine is not turned off and even during electrical discharge machining. A wire collection device of a wire electrical discharge machine comprises: a first collection box having a wire inlet provided at a top portion; a second collection box having a wire inlet provided at a top portion, housed in the first collection box, and capable of being taken out to the outside through an access port formed in the first collection box; and a partition plate provided to be openable and closable for partitioning the interior of the first collection box into lower space for housing the second collection box and upper space, and for making communication between the lower space and the upper space.

5 Claims, 7 Drawing Sheets

WIRE COLLECTION DEVICE OF WIRE ELECTRICAL DISCHARGE MACHINE

This application is based on and claims the benefit of priority from Japanese Patent Application No. 2018-199232, filed on 23 Oct. 2018, the content of which is incorporated herein by reference.

BACKGROUND OF THE INVENTION

Field of the Invention

The present invention relates to a wire collection device of a wire electrical discharge machine.

Related Art

A conventional wire electrical discharge machine includes a wire electrode (wire), an upper feeding element and a lower feeding element contacting the wire electrode, a machining power supply, a table on which a machining target is to be installed, a driver with an X-axis driving unit and a Y-axis driving unit for moving the table forward and backward in an X-axis direction and a Y-axis direction respectively, and an upper die and a lower die through which the wire electrode passes.

The upper die and the lower die each have guide holes. The wire electrode is passed through the guide holes, guided by the guide holes, and positioned above and below the machining target. When the wire electrode tilts, the upper die and the lower die function as an upper support and a lower support respectively for the wire electrode.

The wire electrical discharge machine includes a wire bobbin from which the wire electrode is unwound and supplied, transport rollers in a pair provided in such a manner as to insert the wire electrode unwound from the wire bobbin therebetween and for changing a direction of the unwinding of the wire electrode to a direction toward the table and the machining target, a lower roller for changing a direction of the unwinding of the wire electrode being fed downward from the table and the machining target, and a collection roller for collecting the wire electrode having been changed in direction by the lower roller.

The upper feeding element, the lower feeding element, and the machining target are each connected to the machining power supply, and a voltage is applied between the upper feeding element, the lower feeding element, and the machining target. The machining target can be machined with the wire electrical discharge machine by generating electrical discharge between the machining target installed on the table and the wire electrode.

An operator inputs a machining condition, a machining program, and a control parameter to a computerized numerical control device (CNC), and drive is controlled based on these inputs.

After having been supplied for electrical discharge machining on the machining target, the wire electrode passes through the lower die, and then passes through the lower roller and the collection roller sequentially to be fed and collected in a collection box (see Patent Document 1, for example).

Patent Document 1: Japanese Unexamined Patent Application, Publication No. H04-057626

SUMMARY OF THE INVENTION

The used wire electrode collected in the collection box of the wire electrical discharge machine may be energized by the machining power supply. Hence, to prevent the occurrence of electrical shock to an operator, the wire electrode is collected after the power supply for the wire electrical discharge machine is turned off. The used wire electrode is constantly ejected during the electrical discharge machining, making it impossible to remove the wire collection box and collect and discard the used wire electrode. Hence, work of collecting the used wire electrode has caused a disadvantage of reducing workability of the machining, and in turn, reducing a production rate.

The present invention is intended to provide a wire collection device of a wire electrical discharge machine capable of collecting a used wire electrode even while a power supply for the wire electrical discharge machine is not turned off and even during electrical discharge machining.

The present inventor has found means of collecting a used wire electrode even while a power supply for a wire electrical discharge machine is not turned off and even during electrical discharge machining, thereby achieving the present invention.

(1) The present invention is intended for a wire collection device (wire collection device B described later, for example) of a wire electrical discharge machine (wire electrical discharge machine A described later, for example) for collecting a used wire electrode (wire electrode 3 described later, for example) having been used for electrical discharge machining and fed sequentially, comprising: a first collection box (first collection box 15 described later, for example) having a wire inlet (wire inlet 15a described later, for example) provided at a top portion for introduction of the wire electrode; a second collection box (second collection box 16 described later, for example) having a wire inlet (wire inlet 16a described later, for example) provided at a top portion for introduction of the wire electrode, housed in the first collection box, and capable of being taken out to the outside through an access port (access port 15b described later, for example) formed in the first collection box; and a partition member (partition plate 19b described later, for example) provided to be openable and closable for partitioning the interior of the first collection box into lower space (lower space 18 described later, for example) for housing the second collection box and upper space (upper space 17 described later, for example) communicating with the wire inlet of the first collection box, and for making communication between the lower space and the upper space. The wire collection device is configured in such a manner that, while the partition member is opened, the wire electrode is fed through the first collection box and the wire inlet of the second collection box into the second collection box and collected in the second collection box, and while the partition member is closed, the wire electrode is fed through the wire inlet of the first collection box, and accumulated and collected on the partition member.

(2) According to the present invention, in the foregoing (1), the wire collection device may comprise: collection box detection unit (collection box detection sensor 22 described later, for example) for detecting the second collection box having been housed in the first collection box; first wire detection unit (first wire detection sensor 23 described later, for example) for detecting an upper limit volume of the wire electrode being stacked on the partition member; second wire detection unit (second wire detection sensor 24 described later, for example) for determining whether the wire electrode being collected and stacked in the second collection box has reached an ejection set volume set in advance for ejection to the outside; and anti-overflow third wire detection unit (third wire detection sensor 25 described later, for example) for detecting an upper limit volume of the wire electrode being collected and stacked in the second collection box.

(3) According to the present invention, in the foregoing (2), if the collection box detection unit detects the second collection box and none of the first wire detection unit, the second wire detection unit, and the third wire detection unit makes detection when a wire cutting signal is transmitted, the partition member may be opened, and if both the collection box detection unit and the second wire detection unit make detections when the wire cutting signal is transmitted, the partition member may be closed.

(4) According to the present invention, in the foregoing (2) or (3), the wire collection device may be configured to issue a warning if the second wire detection unit or the third wire detection unit detects the wire electrode.

According to the present invention, even during machining with the wire electrical discharge machine, in other words, even when machining work is continued without turning off a power supply for the wire electrical discharge machine, the second collection box can be removed and the used wire electrode can be collected and discarded.

DETAILED DESCRIPTION OF THE INVENTION

A wire collection device of a wire electrical discharge machine according to an embodiment of the present invention will be described below by referring to FIGS. 1 to 10.

The embodiment relates to a wire electrical discharge machine that performs machining on a machining target by applying a voltage between poles of a wire electrode and the machining target (a workpiece or a subject of the machining) (applying a voltage to a gap therebetween) and generating electrical discharge. In particular, the embodiment relates to a wire collection device for collecting a used wire electrode having been fed sequentially and used for the machining on the machining target.

Figure 1:
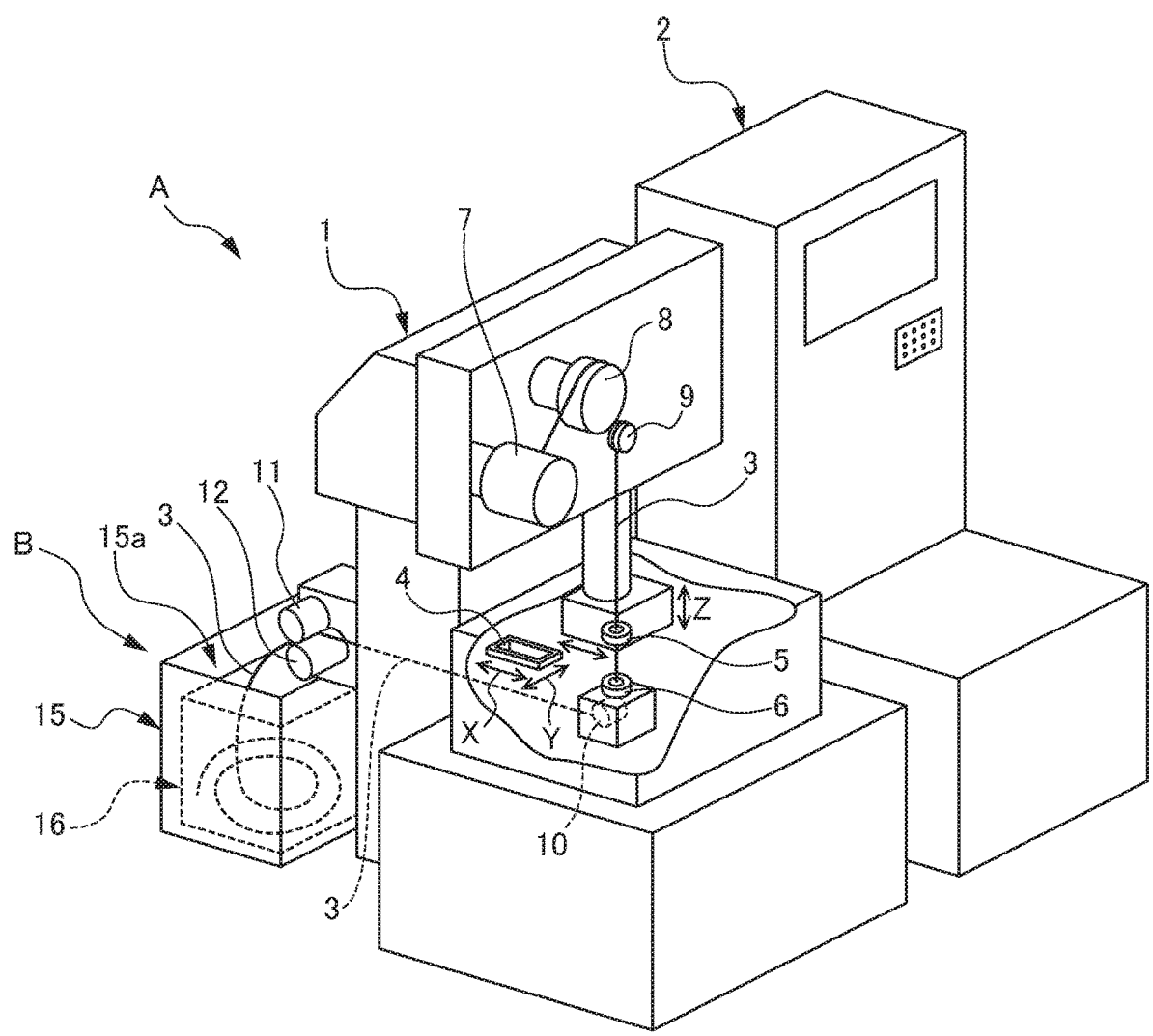
FIG. 1 is a perspective view showing an example of a wire electrical discharge machine (wire collection device) according to an embodiment of the present invention.

As shown in FIG. 1, a wire electrical discharge machine A of the embodiment includes a machine body 1, a controller 2 such as a computerized numerical control device (CNC), and a wire collection device B.

The machine body 1 includes a wire electrode 3, an upper feeding element and a lower feeding element (not shown) contacting the wire electrode 3, a machining power supply (not shown), a table 4 on which a machining target is to be installed, a driver (not shown) with an X-axis driving unit and a Y-axis driving unit for moving the table 4 forward and backward in an X-axis direction and a Y-axis direction respectively, and an upper die 5 and a lower die 6 through which the wire electrode 3 passes.

The machine body 1 further includes a wire bobbin 7 from which the wire electrode 3 is unwound and supplied, transport rollers 8 and 9 in a pair provided in such a manner as to insert the wire electrode 3 unwound from the wire bobbin 7 therebetween and for changing a direction of the unwinding of the wire electrode 3 to a direction toward the table 4 and the machining target, a lower roller 10 for changing a direction of feeding of the wire electrode 3 being fed downward from the table 4 and the machining target, and a collection roller 11 and a collection roller 12 for feeding the wire electrode 3 having been changed in direction by the lower roller 10 to the wire collection device B for collection of the wire electrode 3.

In the wire electrical discharge machine A, the upper feeding element, the lower feeding element, and the machining target are each connected to a machining power supply, and a voltage is applied between the upper feeding element, the lower feeding element, and the machining target. The machining target can be subjected to electrical discharge machining by generating electrical discharge between the machining target installed on the table 4 and the wire electrode 3.

After having been supplied for electrical discharge machining on the machining target, the wire electrode 3 passes through the lower die 6, and then passes through the lower roller 10 and the collection rollers 11 and 12 to be collected by the wire collection device B.

Drive of the wire electrical discharge machine A of the embodiment is controlled on the basis of a machining condition, a machining program, and a control parameter input to the controller (CNC) 2 by an operator.

Figure 2:
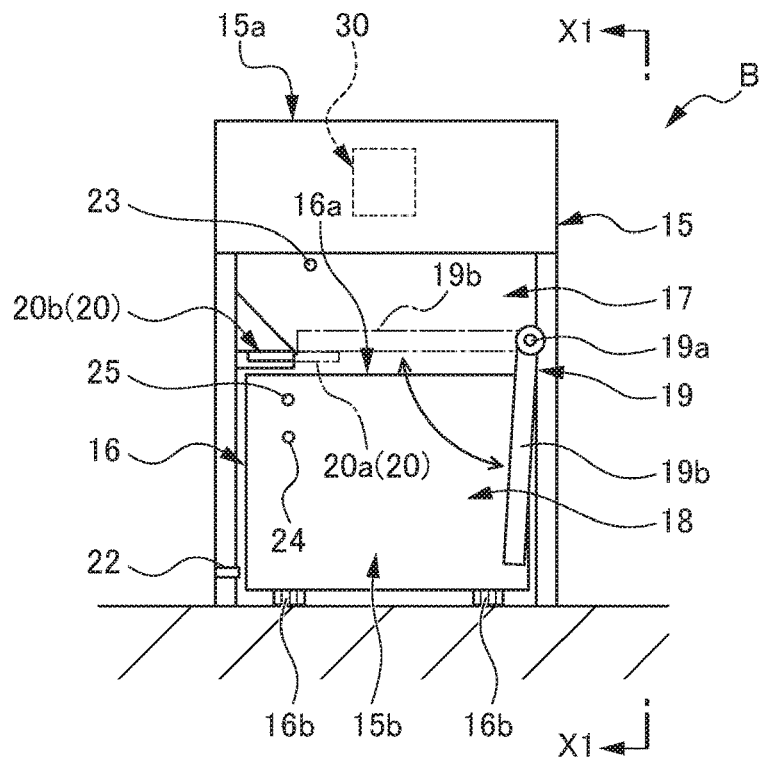
FIG. 2 is a front view showing the wire collection device of the wire electrical discharge machine according to the embodiment of the present invention.
Figure 3:
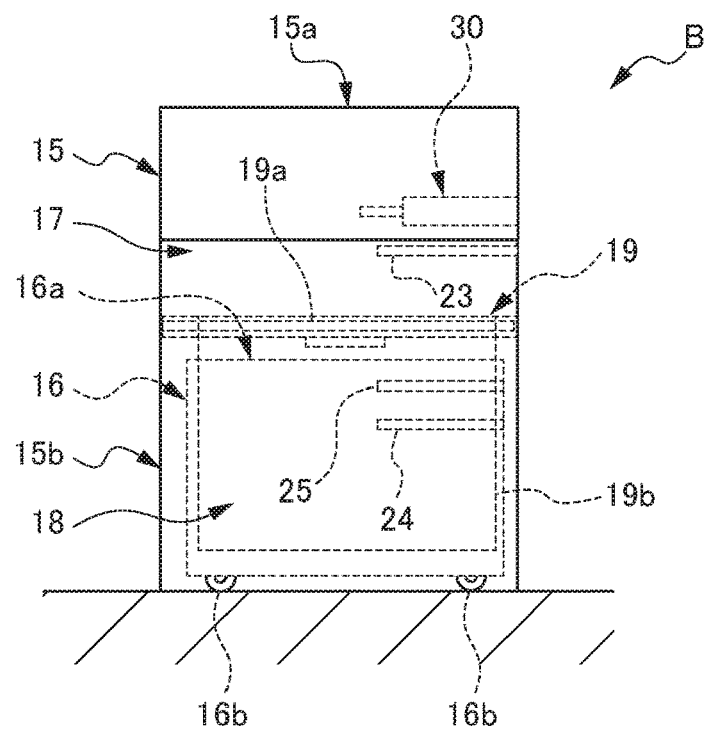
FIG. 3 is a side view taken along an arrowed line X1-X1 in FIG. 2 and showing the wire collection device of the wire electrical discharge machine according to the embodiment of the present invention.

As shown in FIGS. 1, 2, and 3, the wire collection device B of the wire electrical discharge machine A of the embodiment includes a first collection box (outer collection box) 15, a second collection box 15 (inner collection box) 16 arranged inside the first collection box 15, an open/close mechanism 19 for partitioning the interior of the first collection box 15 into upper space 17 and lower space 18, and a wire cutting mechanism 30.

The first collection box 15 is formed into a square box shape and is provided with a wire inlet 15a formed of an opening at the upper surface of the first collection box 15. The first collection box 15 further includes an access port 15b for the second collection box 16 formed of an opening extending from a lower end to a predetermined height position of one side surface of the first collection box 15.

As shown in FIGS. 2 and 3, the open/close mechanism 19 includes a rotary axis 19a provided in the first collection box 15 and attached in a horizontal posture to the inner surface of the first collection box 15, and a partition plate (partition member) 19b rotatably supported by the rotary axis 19a. When the partition plate 19b is placed horizontally, the partition plate 19b partitions the interior of the first collection box 15 into the upper space 17 and the lower space 18 (closes the lower space 18). When the partition plate 19b rotates to move down, the upper space 17 and the lower space 18 communicate with each other (the lower space 18 is opened). The open/close mechanism 19 further includes a driver (not shown) for rotating the partition plate 19b.

The open/close mechanism 19 includes a partition plate holding mechanism 20 for placing the partition plate 19b horizontally for partitioning into the upper space 17 and the lower space 18, and for holding the partition plate 19b in this closed posture.

The partition plate holding mechanism 20 includes: a latching part (stopper part) 20a provided at a tip portion of the partition plate 19b, for example, in such a manner as to be capable of advancing and retreating outward and inward from the tip of the partition plate 19b (in such a manner as to be capable of appearing and disappearing from the tip); a latch receiving part (stopper support) 20b provided integrally with the first collection box 15 and projecting from a predetermined position on the inner surface of the first collection box 15, and for holding the partition plate 19b by making engagement with the latching part 20a in an advanced position; and an actuator (not shown) such as a piston cylinder for making the latching part 20a advance and retreat.

At the open/close mechanism 19, the driver is driven to place the partition plate 19b horizontally. Further, the actuator is driven to make the latching part 20a project laterally externally from the tip of the partition plate 19b to engage the latching part 20a with the latch receiving part 20b facing the latching part 20a and projecting from the inner surface of the first collection box 15. Then, the partition plate 19b is held closed. In this way, the interior of the first collection box 15 can be partitioned into the upper space 17 and the lower space 18 by the partition plate 19b.

When the actuator is driven to make the latching part 20a retreat from the tip of the partition plate 19b, the latching part 20a and the latch receiving part 20b are released from the engagement state, and the partition plate 19b rotates downward to be opened. This forms communication between the upper space 17 and the lower space 18 in the first collection box 15.

The second collection box 16 is formed into a square box shape smaller than the first collection box 15, for example, and includes a wire inlet 16a formed of an opening at the upper surface of the second collection box 16. The second collection box 16 is housed in the first collection box 15 through the access port 15b of the first collection box 15 and arranged in an area to become the lower space 18 when the partition plate 19b is closed, namely, in a spatial area below the rotary axis 19a of the open/close mechanism 19.

The second collection box 16 includes moving unit prepared by providing wheels 16b at the lower end of the second collection box 16 or by locating the second collection box 16 on a rail, for example. The second collection box 16 is provided in such a manner as to be capable of getting out of the first collection box 15 and getting into the first collection box 15 through the access port 15b of the first collection box 15.

The wire cutting mechanism 30 is used for cutting the wire electrode 3 having been fed into the first collection box 15 through the wire inlet 15a, separating the used wire electrode 3, and collecting the separated wire electrode 3 in the collection box 15 or 16. For example, the wire cutting mechanism 30 includes a cutting tool with a cutting blade for cutting the wire electrode 3. The cutting tool is formed by performing an electrical insulating process on the cutting blade that is to contact the wire electrode 3, for example. In the embodiment, the wire cutting mechanism 30 is provided at a predetermined high position close to the wire inlet 15a in the first collection box 15. The position of installing the wire cutting mechanism 30 is not particularly limited.

Referring next to FIGS. 2 and 3, in the wire collection device B of the wire electrical discharge machine A of the embodiment, a collection box detection sensor (collection box detection unit) 22 is provided for detecting the second collection box 16 having been housed in the first collection box 15.

A first wire detection sensor (first wire detection unit) 23 is provided for detecting an upper limit volume (upper limit height position) of the wire electrode 3 being introduced through the wire inlet 15a of the first collection box 15 and being stacked on the partition plate 19b with the partition plate 19b being closed.

A second wire detection sensor (second wire detection unit) 24 is provided for determining whether the wire electrode 3 being collected and stacked in the second collection box 16 has reached a volume set in advance for ejection to the outside. An anti-overflow third wire detection sensor (third wire detection unit) 25 is provided for detecting an upper limit volume (upper limit height position) of the wire electrode 3 being collected and stacked in the second collection box 16.

The first wire detection sensor 23, the second wire detection sensor 24, and the third wire detection sensor 25 are preferably contact sensors to detect the wire electrode 3 by being touched by the wire electrode 3.

Figure 4:
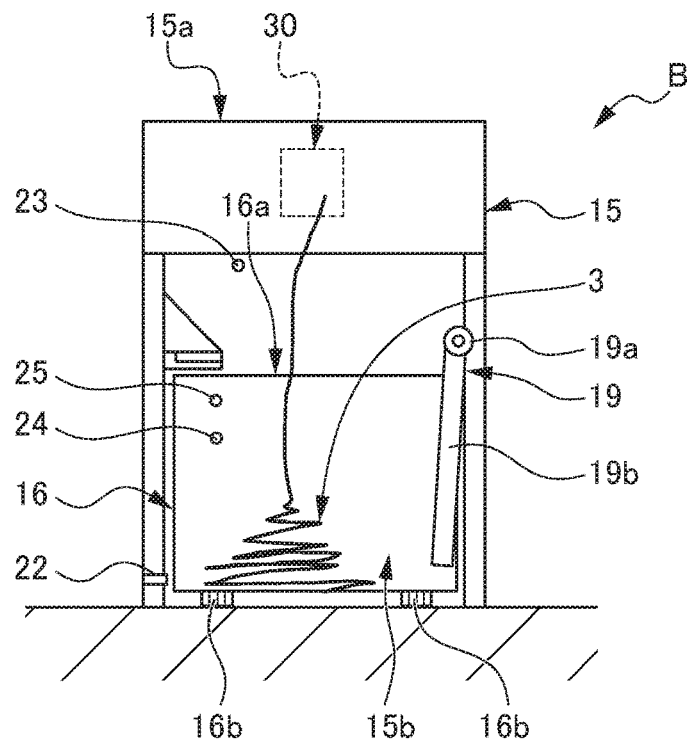
FIG. 4 is a front view of a situation showing how a used wire electrode is collected in a second collection box of the wire collection device of the wire electrical discharge machine according to the embodiment of the present invention.

As shown in FIG. 4, in the wire collection device B of the wire electrical discharge machine A of the embodiment having the foregoing configuration, with the partition plate 19b being opened, the used wire electrode 3 fed from the wire electrical discharge machine A goes into the second collection box 16 through the wire inlets 15a and 16a and is collected in the second collection box 16.

Figure 5:
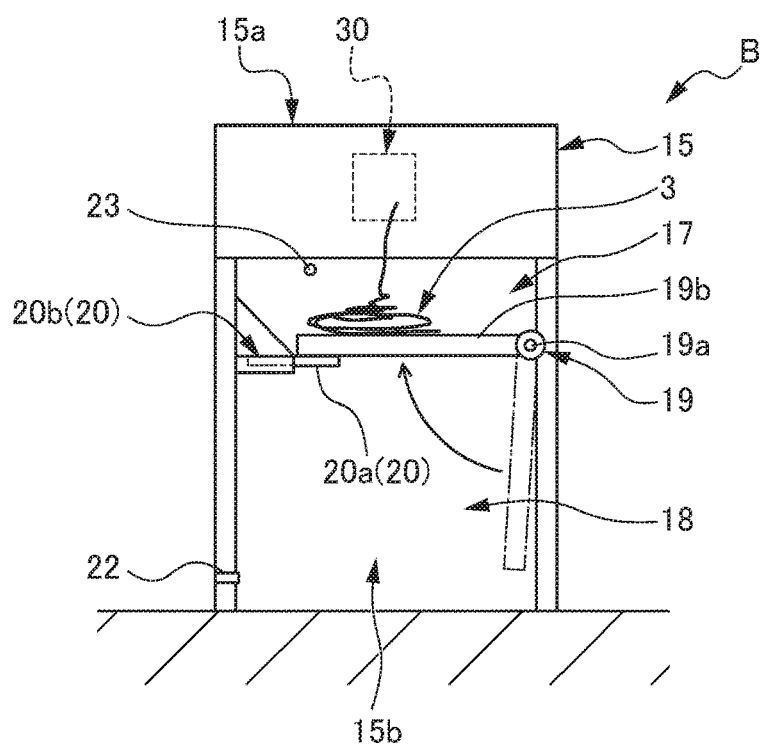
FIG. 5 is a front view of a situation showing how the used wire electrode is accumulated and collected on a partition plate of a first collection box of the wire collection device of the wire electrical discharge machine according to the embodiment of the present invention.
Figure 6:
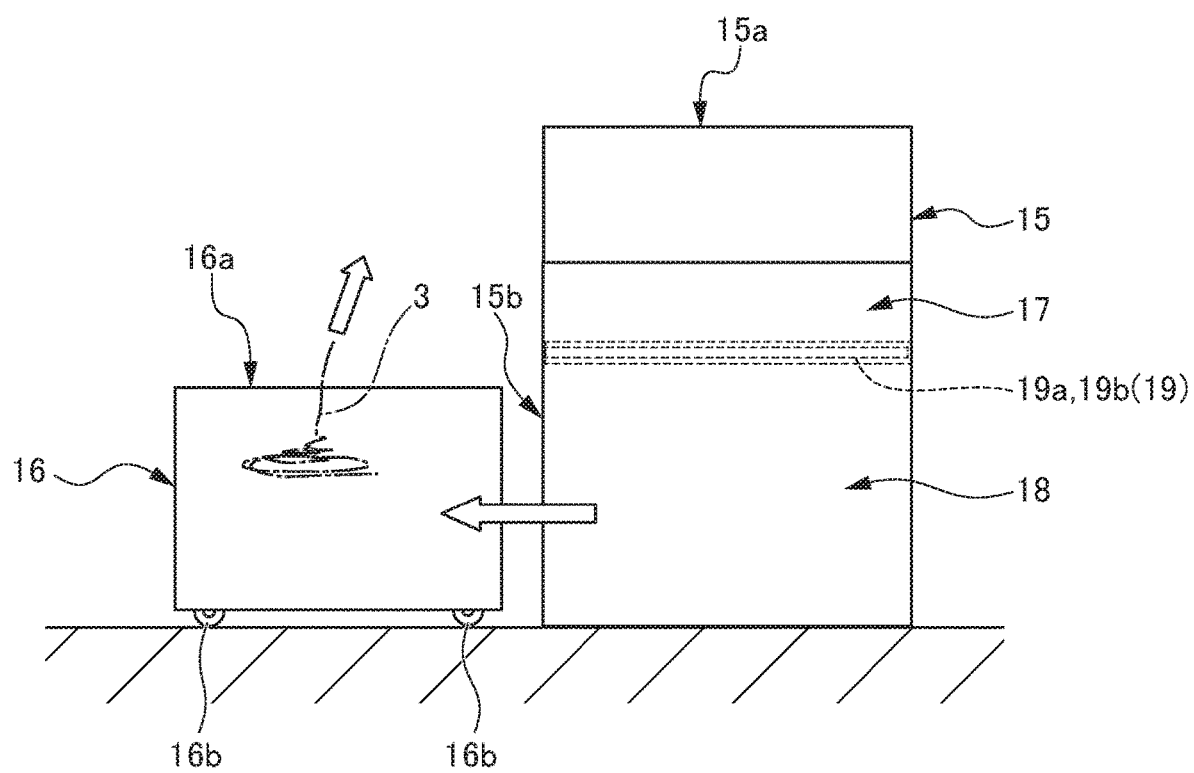
FIG. 6 is a side view of a situation showing how the second collection box is taken out of the first collection box of the wire collection device of the wire electrical discharge machine according to the embodiment of the present invention and how the used wire electrode is collected and discarded.

As shown in FIGS. 5 and 6, when the wire electrode 3 in the second collection box 16 has reached a constant volume (ejection set volume), the used wire electrode 3 is cut by the wire cutting mechanism 30 and the partition plate 19b is closed. Further, the partition plate 19b is held in the closed posture by the partition plate holding mechanism 20. By doing so, the used wire electrode 3 fed from the wire electrical discharge machine A is accumulated on the partition plate 19b.

While the used wire electrode 3 is accumulated on the partition plate 19b, the second collection box 16 is moved out of the first collection box 15 through the access port 15b, and the accumulated used wire electrode 3 is discarded.

The second collection box 16 emptied as a result of discarding of the wire electrode 3 is housed again into the lower space 18 in the first collection box 15. Further, the partition plate 19b is rotated to put the wire electrode 3 accumulated on the partition plate 19b into the second collection box 16, and the used wire electrode 3 being fed from the wire electrical discharge machine A is put and collected again in the second collection box 16.

The collection box detection sensor 22 is provided for detecting the second collection box 16 having been housed in the first collection box 15. Thus, when the emptied second collection box 16 is returned to the lower space 18 of the first collection box 15, drive of the driver for the open/close mechanism 19 may be controlled to open the partition plate 19b automatically on the basis of a result of the detection by the collection box detection sensor 22 having detected the return of the second collection box 16.

Figure 7:
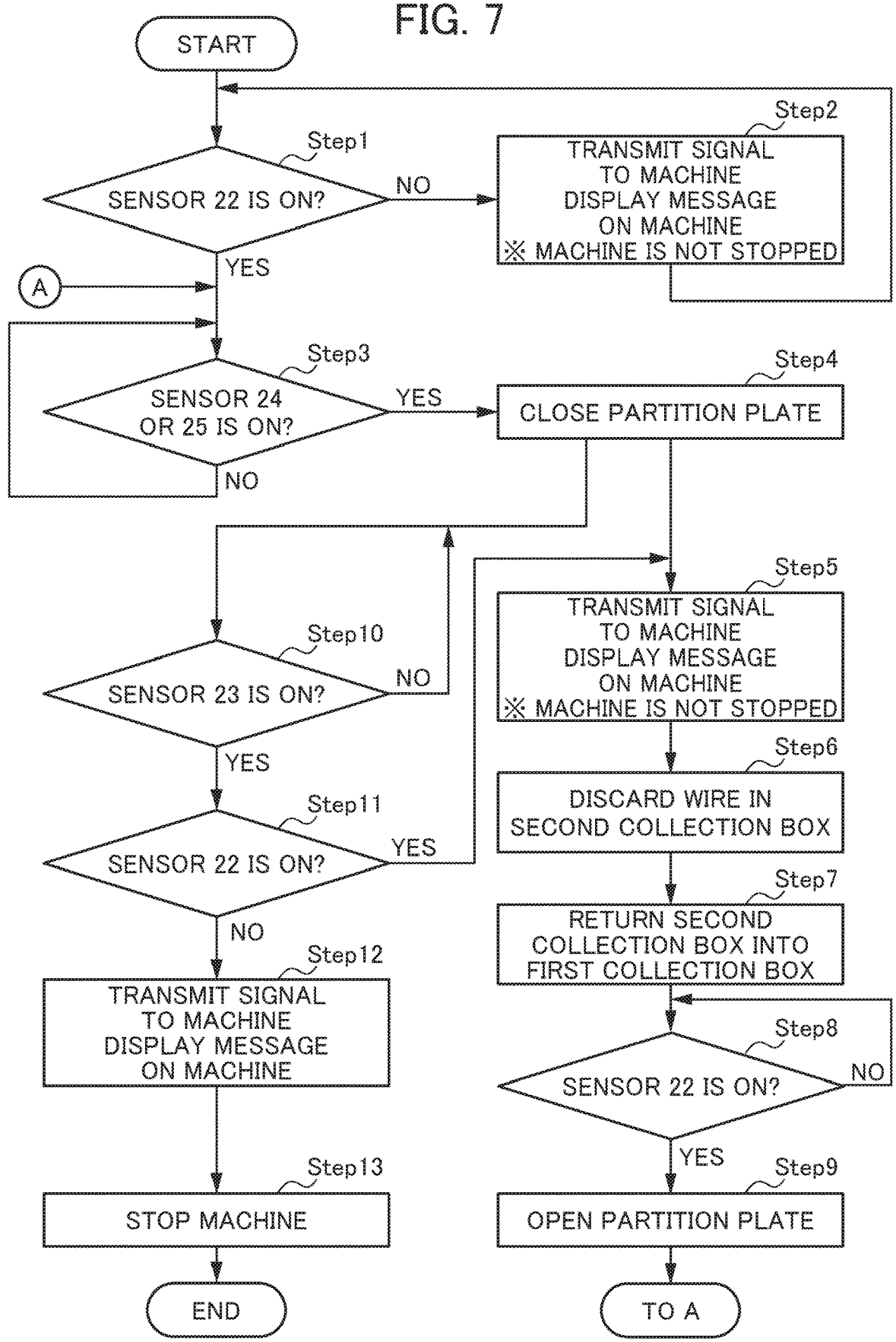
FIG. 7 is a flowchart showing a procedure and a control method of collecting the used wire electrode using the wire collection device of the wire electrical discharge machine according to the embodiment of the present invention.

As shown in FIG. 7, in the wire collection device B of the wire electrical discharge machine A of the embodiment, the collection box detection sensor 22 detects the second collection box 16 being taken out of the first collection box 15 (Step 1), and notifies the controller 2 of the wire electrical discharge machine A regarding the absence of the second collection box 16 in the first collection box 15 (Step 2).

As described above, in the wire collection device B of the wire electrical discharge machine A of the embodiment, even when the second collection box 16 is taken out, the used wire electrode 3 can still be accumulated on the partition plate 19b and can be collected continuously in the first collection box 15. As a result, even in the absence of the second collection box 16 in the first collection box 15, need of exerting control for stopping the wire electrical discharge machine A is eliminated.

Meanwhile, when the second collection box 16 is housed in the first collection box 15, the collection box detection sensor 22 detects the presence of the second collection box 16 (Step 1). Then, states of detections by the second wire detection sensor 24 and the third wire detection sensor 25 are checked to determine whether the wire electrode 3 being collected and stacked in the second collection box 16 has reached an ejection set volume or a limit volume (Step 3).

If the second wire detection sensor 24 or the third wire detection sensor 25 detects the wire electrode 3, the open/close mechanism 19 is driven to close the partition plate 19b (Step 4). A signal indicating this closing of the partition plate 19b is transmitted to the controller 2 of the wire electrical discharge machine A to display a message on the wire electrical discharge machine A (Step 5).

On the basis of this message, etc., an operator takes the second collection box 16 out of the first collection box 15, and discards the used wire electrode 3 (Step 6). After the used wire electrode 3 is discarded, the emptied second collection box 16 is returned into the first collection box 15 (Step 7).

The collection box detection sensor 22 determines whether the second collection box 16 has been returned into the first collection box 15 (Step 8). If the second collection box 16 has been returned, the partition plate 19b is opened and the wire electrode 3 accumulated on the partition plate 19b is introduced into the second collection box 16 (Step 9).

Then, states of detections by the second wire detection sensor 24 and the third wire detection sensor 25 are checked again to determine whether the wire electrode 3 being collected and stacked in the second collection box 16 has reached an ejection set volume or a limit volume (Step 3).

On the other hand, if the second wire detection sensor 24 or the third wire detection sensor 25 detects the wire electrode 3 and the open/close mechanism 19 is driven to close the partition plate 19b (Step 4), it is determined whether the first wire detection sensor 23 detects the wire electrode 3 accumulated on the partition plate 19b (Step 10).

If the first wire detection sensor 23 does not detect the wire electrode 3 accumulated on the partition plate 19b, the determination using the first wire detection sensor 23 is continued.

If the first wire detection sensor 23 detects the wire electrode 3 accumulated on the partition plate 19b, a determination is made as to whether the second collection box 16 has been returned into the first collection box 15 using the collection box detection sensor 22 (Step 11). If the second collection box 16 has been returned, a signal indicating that the wire electrode 3 accumulated on the partition plate 19b has been detected by the first wire detection sensor 23 is transmitted to the controller 2 of the wire electrical discharge machine A to display a message and perform the foregoing operations from Step 5 to Step 9.

By contrast, if the second collection box 16 has not been returned into the first collection box 15 even if the wire electrode 3 accumulated on the partition plate 19b is detected by the first wire detection sensor 23, a determination as to the presence of the second collection box 16 having been returned into the first collection box 15 is made continuously using the collection box detection sensor 22 (Step 11). If the second collection box 16 has been returned, a signal indicating this return is transmitted to the controller 2 of the wire electrical discharge machine A to display a message on the wire electrical discharge machine A (Step 12). At this time, drive of the wire electrical discharge machine A is stopped (Step 13).

In a preferable configuration, if the second wire detection sensor 24 or the third wire detection sensor 25 detects the wire electrode 3, an alarm signal (warning) is issued from the wire electrical discharge machine A (controller 2).

As described above, in the wire collection device B of the wire electrical discharge machine A of the embodiment, by removing or discarding the used wire electrode 3 accumulated in the second collection box 16 for preventing detection of the used wire electrode 3 accumulated on the partition plate 19b by the first wire detection sensor 23, the second collection box 16 can be removed and the used wire electrode 3 can be collected and discarded even during machining with the wire electrical discharge machine A, in other words, even while machining work is continued using the wire electrical discharge machine A.

Thus, while the power supply for the wire electrical discharge machine A is needed to be stopped for collecting and discarding the used wire electrode 3 according to the conventional method, the wire collection device B of the wire electrical discharge machine A of the embodiment eliminates such need. Thus, improvement of workability and productivity (production rate) can be encouraged.

In the wire collection device B of the wire electrical discharge machine A of the embodiment, if the collection box detection sensor 22 detects the second collection box 16 and none of the first wire detection sensor 23, the second wire detection sensor 24, and the third wire detection sensor 25 makes detection when a wire cutting signal is transmitted from the controller 2 of the wire electrical discharge machine A, the partition plate 19b is opened. If both the collection box detection sensor 22 and the second wire detection sensor 24 make detections when the wire cutting signal is transmitted, the partition plate 19b is closed. Thus, if there arises a need to cut and move the wire electrode 3, for example, the used wire electrode 3 can be collected properly in the collection box 15 or 16 after the wire cutting.

While the embodiment of the present invention has been described above, the present invention should not be limited to the foregoing embodiment but can be changed appropriately within a range not deviating from the substance of the invention.

Figure 8:
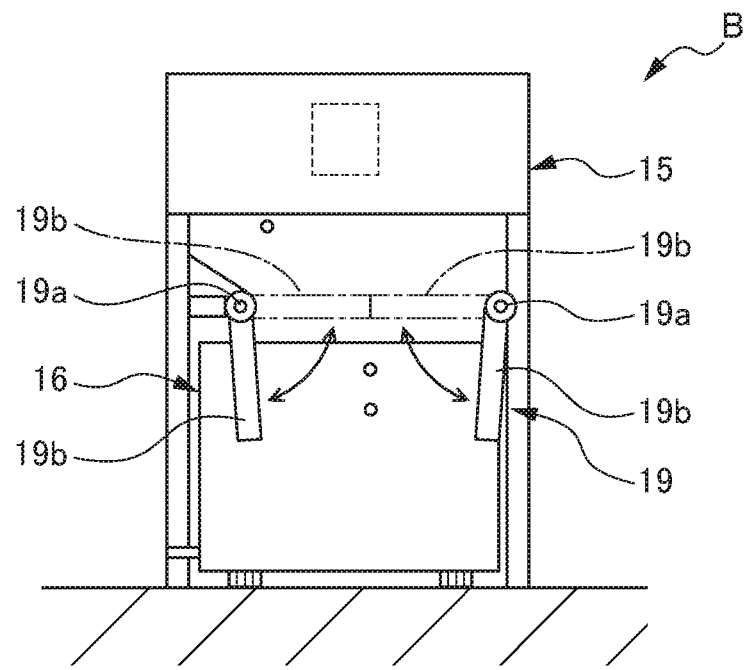
FIG. 8 is a front view showing an exemplary modification of the wire collection device of the wire electrical discharge machine according to the embodiment of the present invention.
Figure 9:
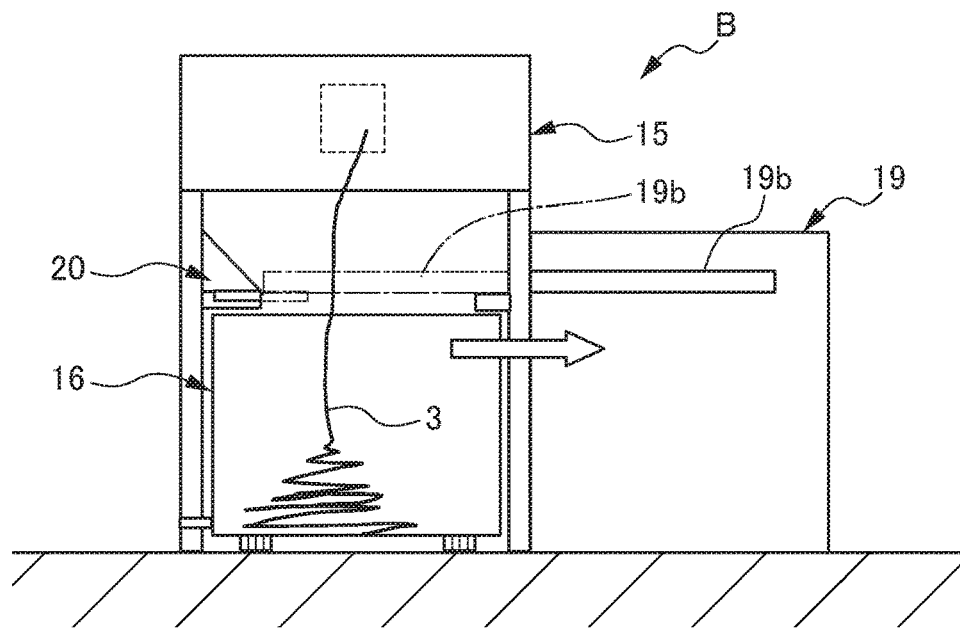
FIG. 9 is a front view showing an exemplary modification of the wire collection device of the wire electrical discharge machine according to the embodiment of the present invention.
Figure 10:
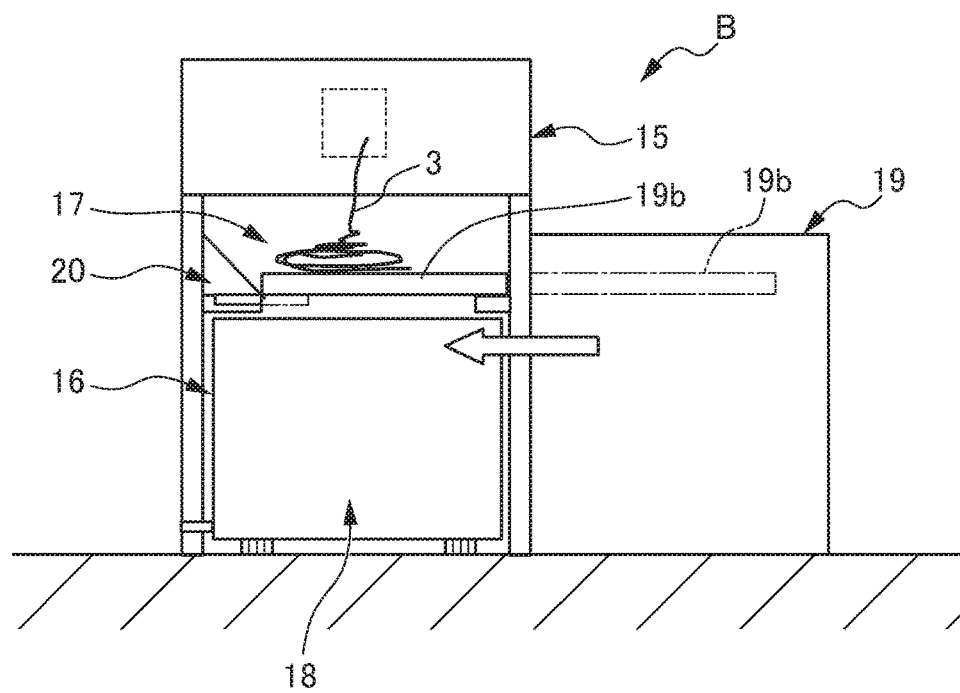
FIG. 10 is a front view showing an exemplary modification of the wire collection device of the wire electrical discharge machine according to the embodiment of the present invention.

The open/close mechanism 19 according to the present invention is not always required to be configured like the configuration of the embodiment but is only required to be configured in such a manner as to allow partitioning of the interior of the first collection box 15 into the upper space 17 and the lower space 18 having a size in which the second collection box 16 can be housed, and allow communication between the upper space 17 and the lower space 18 (allow opening and closing). As shown in FIG. 8, for example, the open/close mechanism 19 may include a plurality of rotary axes 19a and a plurality of partition plates 19b. As shown in FIGS. 9 and 10, for example, for opening and closing of the partition plate 19b, the partition plate 19b may be configured in such a manner as to be capable of being inserted into and taken out of the first collection box 15 (capable of advancing and retreating).

EXPLANATION OF REFERENCE NUMERALS

3 Wire electrode (wire)
15 First collection box (outer collection box)
15a Wire inlet
15b Access port
16 Second collection box (inner collection box)
16a Wire inlet
16b Wheel (moving unit)
17 Upper space
18 Lower space
19 Open/close mechanism
19a Rotary axis
19b Partition plate (partition member)
20 Partition plate holding mechanism
20a Latching part
20b Latch receiving part
22 Collection box detection sensor (collection box detection unit)
23 First wire detection sensor (first wire detection unit)
24 Second wire detection sensor (Second wire detection unit)
25 Third wire detection sensor (third wire detection unit)
A Wire electrical discharge machine
B Wire collection device

What is claimed is:

1. A wire collection device of a wire electrical discharge machine for collecting a used wire electrode having been used for electrical discharge machining and fed sequentially, comprising:
   a first collection box having a wire inlet provided at a top portion for introduction of the wire electrode;
   a second collection box having a wire inlet provided at a top portion for introduction of the wire electrode, housed in the first collection box, and capable of being taken out to the outside through an access port formed in the first collection box; and
   a partition member provided to be openable and closable for partitioning the interior of the first collection box into lower space for housing the second collection box and upper space communicating with the wire inlet of the first collection box, and for making communication between the lower space and the upper space, wherein the wire collection device is configured in such a manner that, while the partition member is opened, the wire electrode is fed through the first collection box and the wire inlet of the second collection box into the second collection box and collected in the second collection box, and
   while the partition member is closed, the wire electrode is fed through the wire inlet of the first collection box, and accumulated and collected on the partition member.

2. The wire collection device of the wire electrical discharge machine according to claim 1, comprising: collection box detection unit for detecting the second collection box having been housed in the first collection box;
   first wire detection unit for detecting an upper limit volume of the wire electrode being stacked on the partition member;
   second wire detection unit for determining whether the wire electrode being collected and stacked in the second collection box has reached an ejection set volume set in advance for ejection to the outside; and
   anti-overflow third wire detection unit for detecting an upper limit volume of the wire electrode being collected and stacked in the second collection box.

3. The wire collection device of the wire electrical discharge machine according to claim 2, wherein
   if the collection box detection unit detects the second collection box and none of the first wire detection unit, the second wire detection unit, and the third wire detection unit makes detection when a wire cutting signal is transmitted, the partition member is opened, and
   if both the collection box detection unit and the second wire detection unit make detections when the wire cutting signal is transmitted, the partition member is closed.

4. The wire collection device of the wire electrical discharge machine according to claim 2, wherein the wire collection device is configured to issue a warning if the second wire detection unit or the third wire detection unit detects the wire electrode.

5. The wire collection device of the wire electrical discharge machine according to claim 3, wherein the wire collection device is configured to issue a warning if the second wire detection unit or the third wire detection unit detects the wire electrode.

* * * * *